United States Patent
Tsirkin (10) Patent No.: US 10,152,341 B2
(45) Date of Patent: Dec. 11, 2018

(54) HYPER-THREADING BASED HOST-GUEST COMMUNICATION

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 155 days.

(21) Appl. No.: 15/251,761

(22) Filed: Aug. 30, 2016

(65) Prior Publication Data

US 2018/0060097 A1 Mar. 1, 2018

(51) Int. Cl.
 *G06F 9/455* (2018.01)
 *G06F 9/48* (2006.01)
 *G06F 9/50* (2006.01)

(52) U.S. Cl.
 CPC ...... *G06F 9/45545* (2013.01); *G06F 9/45558* (2013.01); *G06F 9/4812* (2013.01); *G06F 9/5077* (2013.01); *G06F 2009/45575* (2013.01)

(58) Field of Classification Search
 CPC ............... G06F 9/45545; G06F 9/5077; G06F 9/45558; G06F 9/4812; G06F 2009/45575
 See application file for complete search history.

(56) References Cited

U.S. PATENT DOCUMENTS

| | | | |
|---|---|---|---|
| 8,127,301 B1* | 2/2012 | Waldspurger | G06F 9/45533 718/1 |
| 8,195,968 B2 | 6/2012 | Rothman et al. | |
| 8,352,952 B2 | 1/2013 | Hanquez et al. | |
| 8,539,499 B1 | 9/2013 | Tovpeko et al. | |
| 8,612,949 B2 | 12/2013 | Liao et al. | |
| 8,935,699 B1* | 1/2015 | Vincent | G06F 9/4881 712/244 |
| 9,609,048 B1* | 3/2017 | Nassi | H04L 67/10 |
| 2005/0138442 A1* | 6/2005 | Keller, Jr. | G06F 1/3203 713/300 |
| 2006/0130062 A1* | 6/2006 | Burdick | G06F 9/4881 718/100 |
| 2006/0242389 A1* | 10/2006 | Browning | G06F 9/5044 712/229 |
| 2008/0104296 A1* | 5/2008 | Blackmore | G06F 9/4812 710/267 |

(Continued)

OTHER PUBLICATIONS

Leng et al., An Empirical Study of Hyper-Threading in High Performance Computing Clusters, Dell Computer Corp. U.S.A., 2002 (12 pages).

(Continued)

*Primary Examiner* — Adam Lee
(74) *Attorney, Agent, or Firm* — K&L Gates LLP (57) ABSTRACT

A system and method for hyper-threading based host-guest communication includes storing, by a guest, at least one request on a shared memory. A physical processor, in communication with the shared memory, includes a first hyper-thread and a second hyper-thread. The method also includes starting, by a hypervisor, execution of a VCPU on the first hyper-thread and sending a first interrupt to the second hyper-thread to signal a request to execute a slave task on the second hyper-thread. The slave task includes an instruction to poll the shared memory. The method further includes executing, by the second hyper-thread, the slave task on the second hyper-thread and executing the at least one request stored on the shared memory.

13 Claims, 4 Drawing Sheets

(56) References Cited

U.S. PATENT DOCUMENTS

| | | | |
|---|---|---|---|
| 2008/0244222 A1* | 10/2008 | Supalov | G06F 9/5077 |
| | | | 712/13 |
| 2009/0271796 A1* | 10/2009 | Kojima | G06F 9/4881 |
| | | | 718/103 |
| 2011/0072426 A1* | 3/2011 | Huang | G06G 9/544 |
| | | | 718/1 |
| 2012/0185866 A1 | 7/2012 | Couvee et al. | |
| 2013/0047159 A1* | 2/2013 | Low | G06F 9/45558 |
| | | | 718/1 |
| 2014/0181830 A1 | 6/2014 | Naik et al. | |
| 2014/0331222 A1 | 11/2014 | Zheng | |
| 2015/0312116 A1* | 10/2015 | Taheri | H04L 67/10 |
| | | | 709/224 |

OTHER PUBLICATIONS

Saint et al., The Impact of Hyper-Threading on Processor Resource Utilization in Production Applications, NASA Advanced Supercomputing Division, 2011, Link: https://www.nas.nasa.gov/assets/pdf/papers/saini_s_impact_hyper_threading_2011.pdf (10 pages).

Jones, Bill, Will Hyper-Threading Improve Processing Performance?, Sr. Solution Architect, Dasher Technologies, Jan. 23, 2014 (8 pages).

* cited by examiner

HYPER-THREADING BASED HOST-GUEST COMMUNICATION

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides new and innovative methods and systems for hyper-threading based host-guest communication. For example, an example method includes storing, by a guest on a virtual machine, at least one request on a shared memory. A physical processor is in communication with the shared memory and the physical processor includes a first hyper-thread and a second hyper-thread. The method also includes determining, by a hypervisor executing on the first hyper-thread, whether to execute a virtual central processing unit (VCPU) of the virtual machine. The VCPU is configured to execute on the first hyper-thread. Responsive to a determination by the hypervisor to execute the VCPU, the hypervisor starts execution of the VCPU on the first hyper-thread at a first time and sends, at the first time, a first interrupt to the second hyper-thread to signal a request to execute a slave task on the second hyper-thread. The slave task includes an instruction to poll the shared memory. Responsive to handling the first interrupt, the second hyper-thread executes the slave task on the second hyper-thread and executes the at least one request stored on the shared memory.

In an example embodiment, a system includes a shared memory and a physical processor, in communication with the shared memory. The physical processor includes a first hyper-thread and a second hyper-thread. The system also includes a virtual machine including a guest. The guest is configured to store at least one request on the shared memory. In an example, the guest is configured to execute an instruction to store the at least one request on the share memory on a virtual central processing unit (VCPU) of the virtual machine. The system further includes a hypervisor executing on the first hyper-thread. The hypervisor is configured to determine whether to execute the VCPU. The VCPU is configured to execute on the first hyper-thread. Responsive to a determination by the hypervisor to execute the VCPU, the hypervisor is also configured to start executing the VCPU on the first hyper-thread at a first time and send, at the first time, a first interrupt to signal a request to execute a slave task on the second hyper-thread. The slave task includes an instruction to poll the shared memory. The second hyper-thread is configured to execute the slave task on the second hyper-thread responsive to handling the first interrupt. The second hyper-thread is further configured to execute the at least one request stored on the shared memory.

Additional features and advantages of the disclosed methods and system are described in, and will be apparent from, the following Detailed Description and the Figures.

DETAILED DESCRIPTION OF EXAMPLE EMBODIMENTS

Described herein are methods and systems for hyper-threading based host-guest communication. When a guest running within a virtual machine needs to execute a privileged operation (e.g., an I/O instruction to a physical storage device attached to the host hardware), one way of doing so can be by writing requests to a virtual shared device based on shared memory. The host operating system may typically access the shared memory to determine whether there are any requests pending from the guest, which is typically referred to as polling the shared device.

A virtual machine exit (VM exit) causes a transition of control from the virtual machine to the software layer providing the virtualization, commonly referred to as a hypervisor (also known as a virtual machine monitor (VMM)). VM exits are generally one of the major sources of virtualization overhead. One way to avoid VM exits is to use shared memory to communicate data between the host and the guest. However, unless the host is running all the time, such communication typically still requires a VM exit. Furthermore, such memory accesses and running the host all the time in a polling mode can increase the power requirements of the system significantly. Aspects of the present disclosure addresses the above noted problems by providing host-guest communication system based on hyper-threading technology.

Hyper-threading technology enables execution of threads in parallel using a single processor. In a processor supporting hyper-threading, a single physical processor appears as two logical processors (hyper-threads). Because the processor resources are shared and the architectural state is duplicated for the two hyper-threads, communication through shared memory between the two hyper-threads within the same processor is relatively cheap and efficient.

The present disclosure provides methods and systems for host-guest communication using the hyper-threading technology. In an example embodiment, two hyper-threads include a master hyper-thread and a slave hyper-thread. For example, when a hypervisor starts executing a VCPU on the master hyper-thread, the hypervisor sends an interrupt to the slave hyper-thread in the same processor to signal a request to start executing a task on the slave hyper-thread. When the hypervisor stops execution of the VCPU, the hypervisor sends another interrupt to the slave hyper-thread to stop executing the task on the slave-hyper-thread. The task on the slave hyper-thread may include an instruction to poll the shared memory. In an example embodiment, the VCPU is always running on the master hyper-thread. Because the master hyper-thread and the slave hyper-thread are in the same processor, sending interrupts from the master hyper-thread to the slave hyper-thread can be efficiently performed.

The present disclosure advantageously allows the system to run both the slave hyper-thread and the VCPU on the master hyper-thread concurrently. Therefore, aspects of the present disclosure are capable of executing both the task on the slave hyper-thread and the VCPU on the master hyper-thread at the same time in the same processor and, thus, do not require a VM to exit to run the task on the slave hyper-thread. Furthermore, the guest also may run without being halted until the task on the slave hyper-thread is completed. In addition, since the task on the slave hyper-thread may only poll a memory location on the shared memory when the VCPU is in the state of executing, aspects of the present disclosure can avoid a waste of CPU resources by preventing continued polling of the shared memory when the VCPU is not executing. Additional features and advantages of the disclosed method, system, and apparatus are described below.

Figure 1:
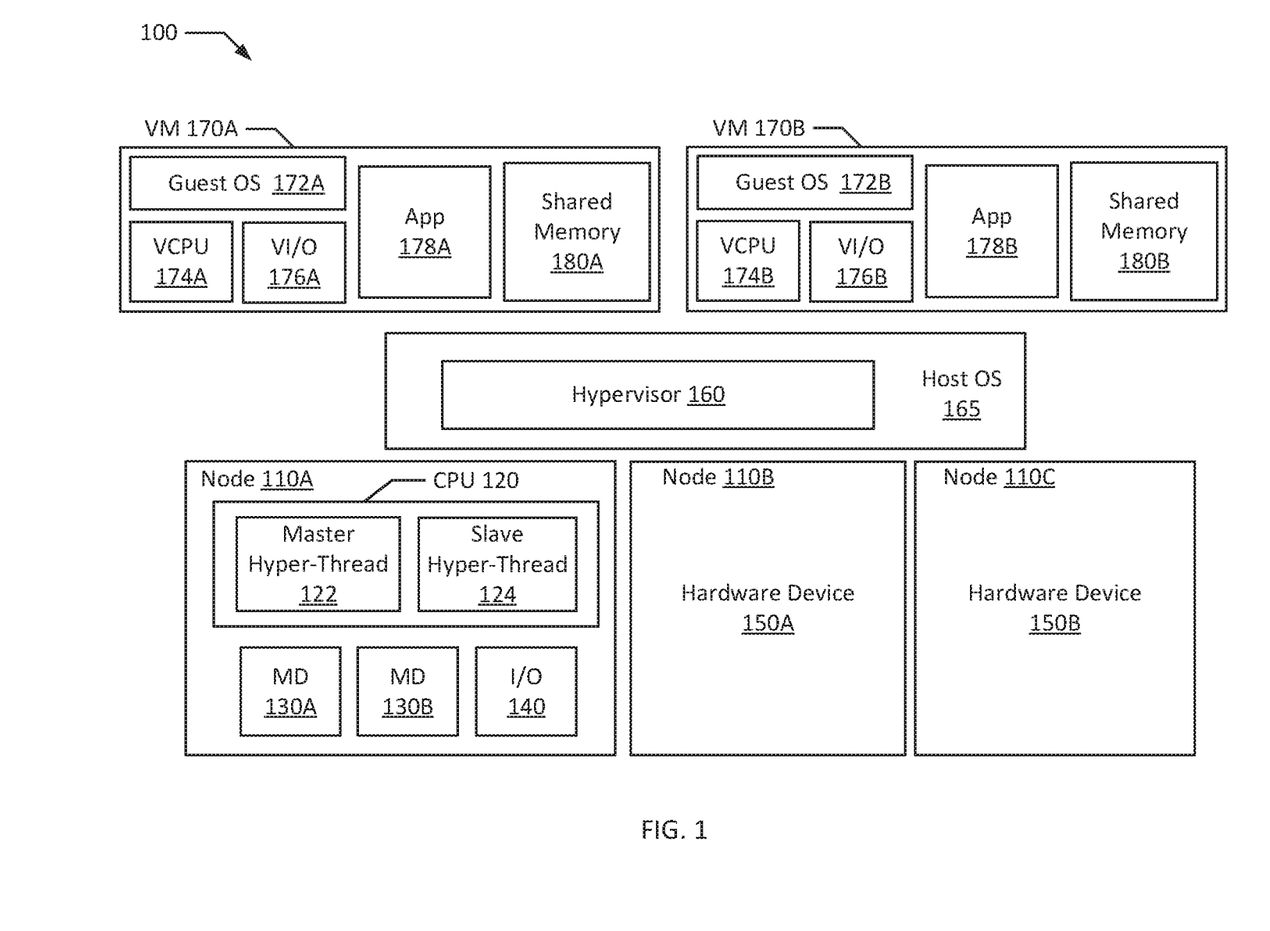
FIG. 1 is a block diagram of an example hyper-threading based host-guest communication system according to an example embodiment of the present disclosure.

FIG. 1 depicts a high-level component diagram of an example hyper-threading based host-guest communication system 100 in accordance with one or more aspects of the present disclosure. The computer system 100 may include one or more interconnected nodes 110A-C. The node 110A may in turn include one or more physical processors (e.g., CPU 120) communicatively coupled to memory devices (e.g., MD 130A-B) and input/output devices (e.g., I/O 140). Each node 110B-C may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may provide a hyper-threading technology where a single physical processor may appear as two logical processors (e.g., a master hyper-thread 122 and a slave hyper-thread 124). In a processor using the hyper-threading technology, the physical processor resources are shared between the two logical processors and the architectural state is duplicated for the two logical processors.

As discussed herein, a memory device 130A-B refers to a volatile or non-volatile memory device, such as RAM, ROM, EEPROM, or any other device capable of storing data. As discussed herein, I/O device 140 refers to a device capable of providing an interface between one or more processor pins and an external device capable of inputting and/or outputting binary data.

Processor 120 may be interconnected using a variety of techniques, including a point-to-point processor interconnect, and a system area network, such as an Ethernet-based network. Local connections within each node 110A-C, including the connections between a processor 120 and a memory device 130A-B and between a processor 120 and an I/O device 140 may be provided by one or more local buses of suitable architecture, for example, peripheral component interconnect (PCI). As used herein, a device of the host OS 165 (or "host device") may refer to CPU 120, MD 130A-B, I/O 140, a software device, and/or hardware device 150A-B.

As noted above, the system 100 may run multiple virtual machines (e.g., VM 170A-B), by executing a software layer (e.g., hypervisor 160) above the hardware and below the virtual machines 170A-B, as schematically shown in FIG. 1. In an example embodiment, the hypervisor 160 may be a component of the host operating system 165 executed by the system 100. In another example embodiment, the hypervisor 160 may be provided by an application running on the operating system 165 or may run directly on the system 100 without an operating system beneath it. The hypervisor 160 may virtualize the physical layer, including processors, memory, and I/O devices, and present this virtualization to virtual machines 170A-B as devices, including virtual processors (e.g., VCPU 174A-B), virtual memory devices (e.g., shared memory 180A-B), and/or virtual I/O devices (e.g., VI/O 176A-B).

In an example embodiment, a virtual machine 170A-B may execute a guest operating system 172A-B which may utilize the underlying VCPU 174A-B, shared memory 180A-B, and VI/O devices 176A-B. One or more applications 178A-B may be running on a virtual machine 170A-B under the guest operating system 172A-B. In an example embodiment, a device may be any device (e.g., VCPU 174A-B, shared memory 180A-B, VI/O devices 176A-B, etc.) of a guest operating system 172A-B, such a device may be referred to as a "guest device".

A virtual machine 170A-B may run any type of dependent, independent, compatible, and/or incompatible applications on the underlying hardware and OS 165. In an example embodiment, applications (e.g., App 178A-B) executing on a virtual machine 170A-B may be dependent on the underlying hardware and/or OS 165. In another example embodiment, applications 178A-B executing on a virtual machine 170A-B may be independent of the underlying hardware and/or OS 165. For example, application 178A executing on a first virtual machine 170A may be dependent on the underlying hardware and/or OS 165 while application 178B executing on a second virtual machine 170B may be independent of the underlying hardware and/or OS 165. Additionally, applications 178A-B executing on a virtual machine 170A-B may be compatible with the underlying hardware and/or OS 165. In an example embodiment, applications 178A-B executing on a virtual machine 170A-B may be incompatible with the underlying hardware and/or OS 165. For example, application 178A executing on one virtual machine 170A may be compatible with the underlying hardware and/or OS 165 while application 178B executing on another virtual machine 170B may be incompatible with the underlying hardware and/or OS 165. In an example embodiment, a device may be implemented as a virtual machine 170.

In an example embodiment, a virtual machine 170A-B may include a virtual processor (VCPU) 174A-B. Processor virtualization may be implemented by the hypervisor 160 scheduling time slots on one or more physical processors 120 such that from the guest operating system's perspective those time slots are scheduled on a virtual processor 174A-B.

Figure 2:
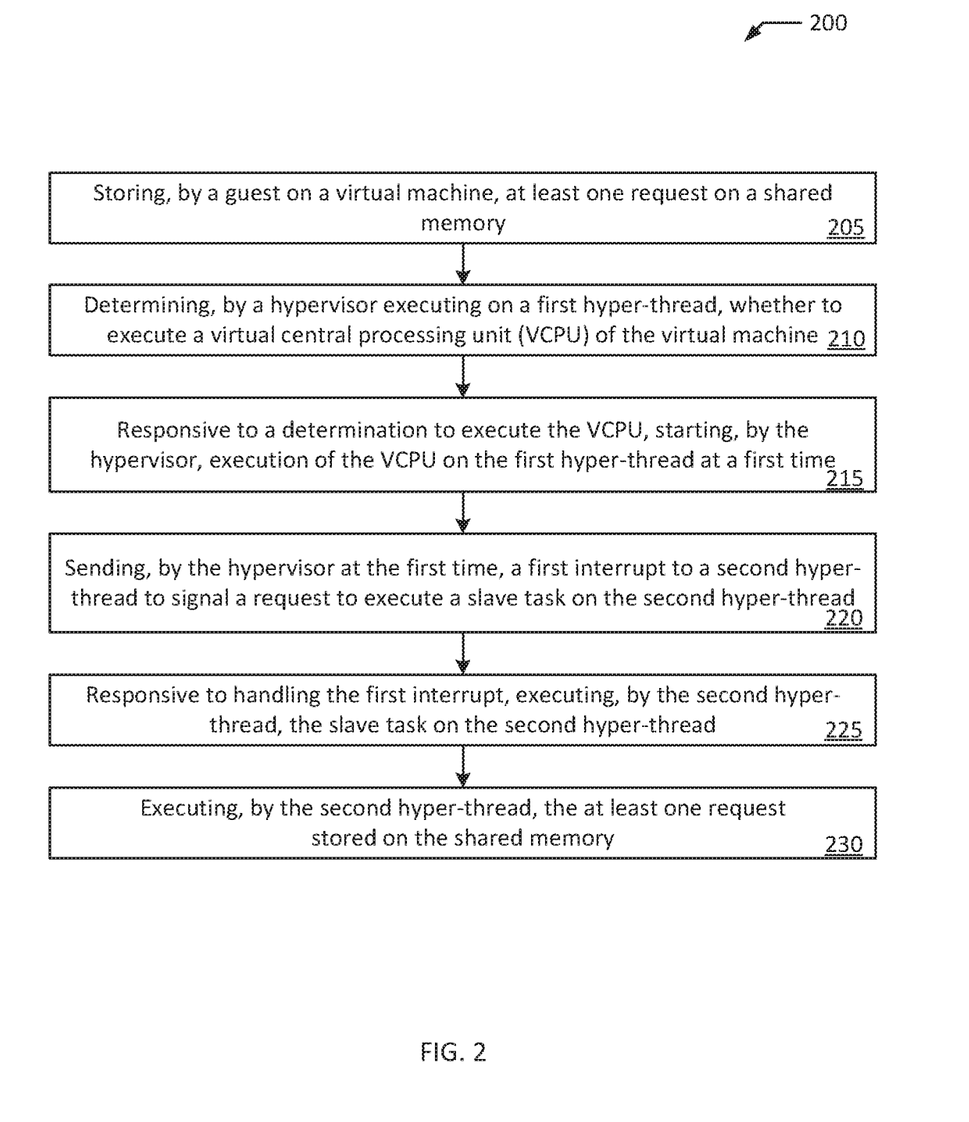
FIG. 2 is a flowchart illustrating an example method of hyper-threading based host-guest communication according to an example embodiment of the present disclosure.

FIG. 2 shows a flowchart of an example method 200 for using the hyper-threading technology for host-guest communication. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional.

In the illustrated example embodiment, a guest may store at least one request on a shared memory (block 205). For example, the guest OS 172A-B or Application 178A-B running on the guest OS 172A-B may store at least one request on a shared memory 180A-B. In an example, the guest is configured to execute an instruction to store the at least one request on the share memory on a virtual central processing unit (VCPU) of the virtual machine. As used herein, a guest may refer to any software running within the virtual machines (e.g., VM 170A-B), such as guest operating systems (e.g., guest OS 172A-B) or applications running on the guest operating systems (e.g., Applications 178A-B). The shared memory 180A-B may be in communication with a physical processor 120. The shared memory 180A-B may be accessible to both the VM 170A-B and the host OS 165. The physical processor 120 may include two logical processors. The hypervisor 160 may designate one of the logical processors as a master hyper-thread 122 and the other as a slave hyper-thread 124.

In an example embodiment, the hypervisor 160 may determine whether to execute a VCPU 174A-B of a virtual machine 170A-B (block 210). In an example embodiment, the hypervisor 160 may be executed on the master hyper-thread 122. In another example embodiment, the hypervisor 165 may be executed on the slave hyper-thread 124. In an example embodiment, the VCPU 174A-B may be executed on the master hyper-thread 122. In another example embodiment, the VCPU 174A-B may be executed on the slave hyper-thread 124. In an example embodiment, the hypervisor 160 may determine to execute the VCPU 174A-B when the hypervisor 160 sends an interrupt to the VCPU 174A-B or when the hypervisor 160 receives a network packet. In an example embodiment, the hypervisor 160 may determine to stop executing the VCPU 174A-B when the hypervisor 160 receives a command from the guest (e.g., guest OS 172A-B or Applications 178A-B) to halt the VCPU 174A-B.

In an example embodiment, responsive to a determination by the hypervisor 160 to execute the VCPU 174A-B, the hypervisor may start execution of the VCPU 174A-B on the master hyper-thread 122 at a first time (block 215). In an example, on this VCPU 174A-B, the guest is executing the instruction to store the at least one request on the share memory. The hypervisor 160 may send at the first time a first interrupt to the slave hyper-thread 124 to signal a request to execute a slave task on the slave hyper-thread 124 (block 220). In an example embodiment, the slave task may include an instruction to poll the shared memory 180A-B.

In an example embodiment, responsive to handling the first interrupt, the slave hyper-thread 124 may execute the slave task on the slave hyper-thread 124 (block 225). In an example embodiment, responsive to executing the slave task, the slave hyper-thread 124 may poll the shared memory 180A-B. In an example embodiment, the slave hyper-thread 124 may execute the at least one request stored on the shared memory 180A-B (block 230). Examples of the request stored on the shared memory 180A-B include, but are not limited to, a request to transmit networking packets and a request to store data on a virtual disk.

In an example embodiment, responsive to a determination by the hypervisor 160 to stop executing the VCPU 174A-B, the hypervisor 160 may stop execution of the VCPU 174A-B on the master hyper-thread 122 at a second time after the first time. The hypervisor 160 may send, at the second time, a second interrupt to the slave hyper-thread to stop executing the slave task. In an example embodiment, responsive to handling the second interrupt, the slave hyper-thread 124 may stop executing the slave task. Then, the slave hyper-thread 124 may stop polling the shared memory 180A-B.

In an example embodiment, the hypervisor 160 may determine an execution state of the VCPU 174A-B. For example, the hypervisor 160 may determine that a VCPU 174A-B that had previously stopped running has started running. The hypervisor 160 may send the first interrupt to the slave hyper-thread 124 responsive to determining that the VCPU 174A-B is executing. The hypervisor 160 may also send the second interrupt to the slave hyper-thread 124 responsive to determining that the VCPU 174A-B is not executing (e.g., the VM 170A-B itself is no longer running). In an example embodiment, if the VCPU 174A-B is still executing, the slave hyper-thread continues to execute the slave task and poll the shared memory 180A-B.

In an example embodiment, the hypervisor 160 may determine, at a third time after the second time, whether an execution state of the VCPU 174A-B has changed. The hypervisor 160 may send, at the third time, a third interrupt to the slave hyper-thread 124 to execute the slave task on the slave hyper-thread 124 responsive to determining that the execution state of the VCPU 174A-B has changed from not-executing to executing.

In an example embodiment, the hypervisor 160 may notify the guest (e.g., guest OS 172A-B or Applications 178A-B) that the slave hyper-thread 124 has started executing the slave task when executing the slave task. The hypervisor 160 may also notify the guest that the slave hyper-thread 124 has stopped executing the slave task when stopping executing the slave task. In an example embodiment, the hypervisor 160 may notify the guest via, for example, an interrupt request or a message written to a data structure in a shared memory location.

Figure 3:
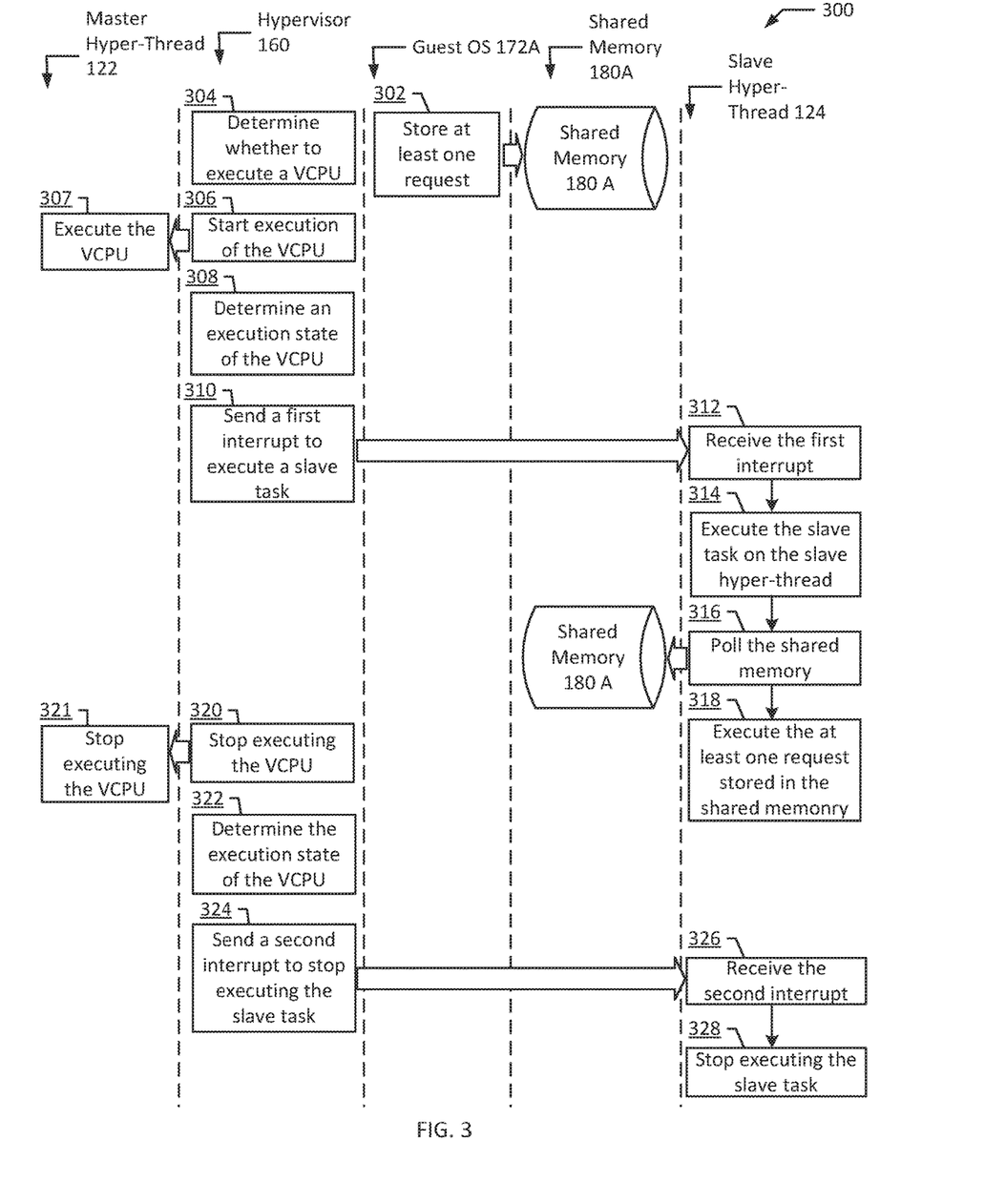
FIG. 3 is a flow diagram illustrating an example process for host-guest communication using hyper-threads according to an example embodiment of the present disclosure.

FIG. 3 illustrates a flow diagram of an example method 300 for hyper-threading based host-guest communication according to an example embodiment of the present disclosure. Although the example method 300 is described with reference to the flow diagram illustrated in FIG. 3, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

In the illustrated example embodiment, the guest OS 172A may store at least one request on a shared memory 180A (block 302). The shared memory 180A may be in communication with a physical processor 120, which may include two logical processors. The hypervisor 160 may designate one of the logical processors as a master hyper-thread 122 and the other as a slave hyper-thread 124. The hyper-threads 122, 124 each include a register file, but share a memory cache and computing logic with each other.

In an example embodiment, the hypervisor 160 may determine whether to execute a VCPU 174A of a virtual machine 170A (block 304). In an example embodiment, the hypervisor 165 may be executed on the master hyper-thread 122. In another example embodiment, the hypervisor 165 may be executed on the slave hyper-thread 124. In an example embodiment, the VCPU 174A may be executed on the master hyper-thread 122. In another example embodiment, the VCPU 174A may be executed on the slave hyper-thread 124.

In an example embodiment, responsive to a determination by the hypervisor 160 to execute the VCPU 174A, the hypervisor 160 may start execution of the VCPU 174A on the master hyper-thread 122 at a first time (block 306). In an example, on this VCPU 174A, the guest executes an instruction to store the at least one request on the share memory. Then, the master hyper-thread 122 may execute the VCPU 174A (block 307). For example, the hypervisor 160 may execute the VCPU 174A by executing a VM entry command that starts the VCPU 174A. Afterwards, the VCPU 174A may be executed by the master hyper-thread 122 until there is an event to trigger a VM exit.

In an example embodiment, the hypervisor 160 may determine an execution state of the VCPU 174A (e.g., currently running and busy, currently running but idle, not currently running, preempted by the host, etc.) (block 308). The hypervisor 160 may send, at the first time, a first interrupt to the slave hyper-thread 124 to signal a request to execute a slave task on the slave hyper-thread 124 (block 310). In an example embodiment, the hypervisor 160 may send the first interrupt to the slave hyper-thread 124 responsive to determining that the VCPU 174A is executing. In an example embodiment, the slave task may include an instruction to poll the shared memory 180A.

In an example embodiment, responsive to receiving the first interrupt (block 312), the slave hyper-thread 124 may execute the slave task on the slave hyper-thread 124 (block 314). In an example embodiment, responsive to executing the slave task, the slave hyper-thread 124 may poll the shared memory 180A (block 316). In an example embodiment, the slave hyper-thread 124 may execute the at least one request stored on the shared memory 180A (block 318).

In an example embodiment, responsive to a determination by the hypervisor 160 to stop executing the VCPU 174A, the hypervisor 160 may stop execution of the VCPU 174A on the master hyper-thread 122 at a second time after the first time (block 320). Then, the master hyper-thread 122 may stop executing the VCPU 174A (block 321). In an example embodiment, the hypervisor 160 may determine an execution state of the VCPU 174A again (block 322). The hypervisor 160 may send, at the second time, a second interrupt to the slave hyper-thread to stop executing the slave task responsive to a determination by the hypervisor to stop executing the VCPU 174A (block 324). In an example embodiment, the hypervisor 160 may send the second interrupt to the slave hyper-thread 124 responsive to determining that the VCPU 174A is not executing. In an example embodiment, responsive to receiving the second interrupt (block 326), the slave hyper-thread 124 may stop execution of the slave task (block 328). Then, the slave hyper-thread 124 may stop polling the shared memory 180A.

In an example embodiment, the hypervisor 160 may determine, at a third time after the second time, whether an execution state of the VCPU 174A has changed. The hypervisor 160 may send, at the third time, a third interrupt to the slave hyper-thread 124 to execute the slave task on the slave hyper-thread 124 responsive to determining that the execution state of the VCPU 174A has changed from not-executing to executing.

In an example embodiment, the hypervisor 160 may notify the guest OS 172A-B that the slave hyper-thread 124 has started executing the slave task when executing the slave task. The hypervisor 160 may also notify the guest OS 172A that the slave hyper-thread 124 has stopped executing the slave task when stopping executing the slave task.

Figure 4:
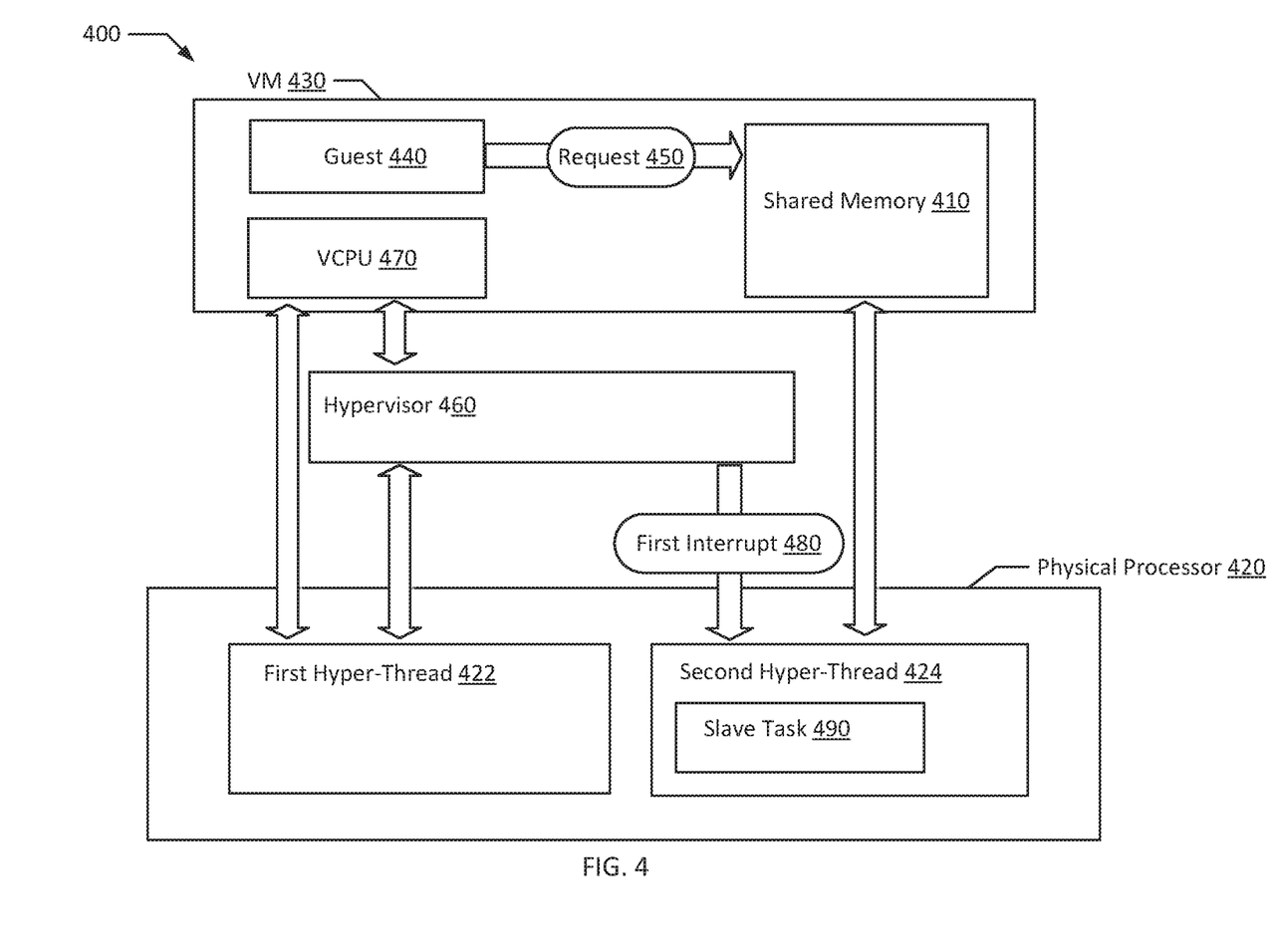
FIG. 4 is a block diagram of an example hyper-threading based host-guest communication system according to an example embodiment of the present disclosure.

FIG. 4 shows a block diagram of an example hyper-threading based host-guest communication system according to an example embodiment of the present disclosure. As illustrated in FIG. 4, an example system 400 may include a shared memory 410 and a physical processor 420, in communication with the shared memory 410. The physical processor 420 may include a first hyper-thread 422 and a second hyper-thread 424. The system 400 may also include a virtual machine 430 including a guest 440. The guest 440 is configured to store at least one request 450 on the shared memory 410. In an example, the guest 440 is configured to execute an instruction to store the at least one request on the share memory on a virtual central processing unit (VCPU) 470 of the virtual machine 430. The system may further include a hypervisor 460 executing on the first hyper-thread 422. The hypervisor 460 may be configured to determine whether to execute the VCPU 470. The VCPU 470 may be configured to execute on the first hyper-thread 422. Responsive to a determination by the hypervisor 460 to execute the VCPU 470, the hypervisor 460 may also be configured to start executing the VCPU 470 on the first hyper-thread 422 at a first time and send, at the first time, a first interrupt 480 to signal a request to execute a slave task 490 on the second hyper-thread 424. The slave task 490 may include an instruction to poll the shared memory 410. The second hyper-thread 424 may be configured to execute the slave task 490 on the second hyper-thread 424 responsive to handling the first interrupt 480. The second hyper-thread 424 may be further configured to execute the at least one request 450 stored on the shared memory 410.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The example embodiments may be embodied in the form of computer-implemented processes and apparatuses for practicing those processes. An embodiment may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
storing, by a guest on a virtual machine, at least one request on a shared memory, wherein a physical processor is in communication with the shared memory, wherein the physical processor includes a first hyper-thread and a second hyper-thread;
determining, by a hypervisor executing on the first hyper-thread, whether to execute a virtual central processing unit (VCPU) of the virtual machine, wherein the VCPU is configured to execute on the first hyper-thread;
responsive to a determination by the hypervisor to execute the VCPU, starting, by the hypervisor, execution of the VCPU on the first hyper-thread at a first time;
sending, by the hypervisor at the first time, a first interrupt to the second hyper-thread to signal a request to execute a slave task on the second hyper-thread, wherein the slave task includes an instruction to poll the shared memory;
responsive to handling the first interrupt, executing, by the second hyper-thread, the slave task on the second hyper-thread and polling, by the second hyper-thread, the shared memory;
executing, by the second hyper-thread, the at least one request stored on the shared memory;
responsive to a determination by the hypervisor to stop executing the VCPU, stopping, by the hypervisor, execution of the VCPU on the first hyper-thread at a second time after the first time;
responsive to the stopping of the execution of the VCPU on the first hyper-thread, sending, by the hypervisor at the second time, a second interrupt to the second hyper-thread to signal a request to stop executing the slave task on the second hyper-thread; and
responsive to handling the second interrupt, stopping, by the second hyper-thread, execution of the slave task on the second hyper-thread and the polling of the shared memory.

2. The method of claim 1, further comprising:
determining, by the hypervisor, at a third time after the second time, whether an execution state of the VCPU has changed; and
sending, by the hypervisor at the third time, a third interrupt to the second hyper-thread to execute the slave task on the second hyper-thread responsive to determining that the execution state of the VCPU has changed from not-executing to executing.

3. The method of claim 1, further comprising:
notifying, by the hypervisor, the guest that the second hyper-thread has started executing the slave task when executing the slave task; and
notifying, by the hypervisor, the guest that the second hyper-thread has stopped executing the slave task when stopping executing the slave task.

4. The method of claim 1, further comprising:
determining, by the hypervisor, an execution state of the VCPU.

5. The method of claim 4, further comprising:
sending, by the hypervisor, the first interrupt to the second hyper-thread responsive to determining that the VCPU is executing.

6. The method of claim 1, further comprising:
responsive to executing the slave task, polling, by the second hyper-thread, the shared memory.

7. The method of claim 1, wherein the guest executes an instruction to store the at least one request on the shared memory on the VCPU.

8. A system comprising:
a shared memory;
a physical processor, in communication with the shared memory, the physical processor including a first hyper-thread and a second hyper-thread;
a virtual machine including a guest, wherein the guest is configured to store at least one request on the shared memory; and
a hypervisor executing on the first hyper-thread, the hypervisor being configured to:
determine whether to execute a virtual central processing unit (VCPU) of the virtual machine, wherein the VCPU is configured to execute on the first hyper-thread;
responsive to a determination by the hypervisor to execute the VCPU, start executing the VCPU on the first hyper-thread at a first time;
send, at the first time, a first interrupt to the second hyper-thread to signal a request to execute a slave task on the second hyper-thread, wherein the slave task includes an instruction to poll the shared memory;
responsive to a determination by the hypervisor to stop executing the VCPU, stop executing the VCPU at a second time after the first time;
responsive to stopping the execution of the VCPU, send a second interrupt to the second hyper-thread to signal a request to stop execution of the slave task on the second hyper-thread, wherein the second hyper-thread is configured to:
responsive to handling the first interrupt, execute the slave task on the second hyper-thread and poll the shared memory;
execute the at least one request stored on the shared memory; and
responsive to handling the second interrupt, stop executing the slave task on the second hyper-thread and the polling of the shared memory.

9. The system of claim 8, wherein the hypervisor is further configured to:
determine at a third time after the second time, whether an execution state of the VCPU has changed; and
send a third interrupt to the second hyper-thread to execute the slave task on the second hyper-thread responsive to determining that the execution state of the VCPU has changed from not-executing to executing.

10. The system of claim 8, wherein the hypervisor is further configured to:
notify the guest that the hypervisor has started executing the slave task when executing the slave task; and
notify the guest that the hypervisor has stopped executing the slave task when stopping execution of the slave task.

11. The system of claim 8, wherein the hypervisor is further configured to:
determine an execution state of the VCPU.

12. The system of claim 11, wherein the hypervisor is further configured to:

send the first interrupt to the second hyper-thread responsive to determining that the VCPU is executing.

13. A non-transitory machine readable medium storing instructions, which when executed by a processor, cause the processor to:

store, by a guest on a virtual machine, at least one request on a shared memory, wherein a physical processor is in communication with the shared memory, wherein the physical processor includes a first hyper-thread and a second hyper-thread;

determine, by a hypervisor executing on the first hyper-thread, whether to execute a virtual central processing unit (VCPU) of the virtual machine, wherein the VCPU is configured to execute on the first hyper-thread;

responsive to a determination by the hypervisor to execute the VCPU, start, by the hypervisor, execution of the VCPU on the first hyper-thread at a first time;

send, by the hypervisor at the first time, a first interrupt to the second hyper-thread to signal a request to execute a slave task on the second hyper-thread, wherein the slave task includes an instruction to poll the shared memory;

responsive to handling the first interrupt, execute, by the second hyper-thread, the slave task on the second hyper-thread and poll, by the second hyper-thread, the shared memory;

execute, by the second hyper-thread, the at least one request stored on the shared memory;

responsive to a determination by the hypervisor to stop executing the VCPU, stop, by the hypervisor, executing the VCPU on the first hyper-thread at a second time after the first time;

responsive to the stopping of the execution of the VCPU on the first hyper-thread, send, by the hypervisor at the second time, a second interrupt to the second hyper-thread to signal a request to stop executing the slave task on the second hyper-thread; and responsive to handling the second interrupt, stop, by the second hyper-thread, executing the slave task on the second hyper-thread and the polling of the shared memory.

\* \* \* \* \*